July 9, 1968    S. R. TYLER    3,391,541
LIQUID FUEL SUPPLY SYSTEM FOR GAS TURBINE ENGINES
Filed Oct. 13, 1966    3 Sheets-Sheet 1

INVENTOR
STANLEY R. TYLER
BY Christensen, Sanborn & Matthews
ATTORNEYS

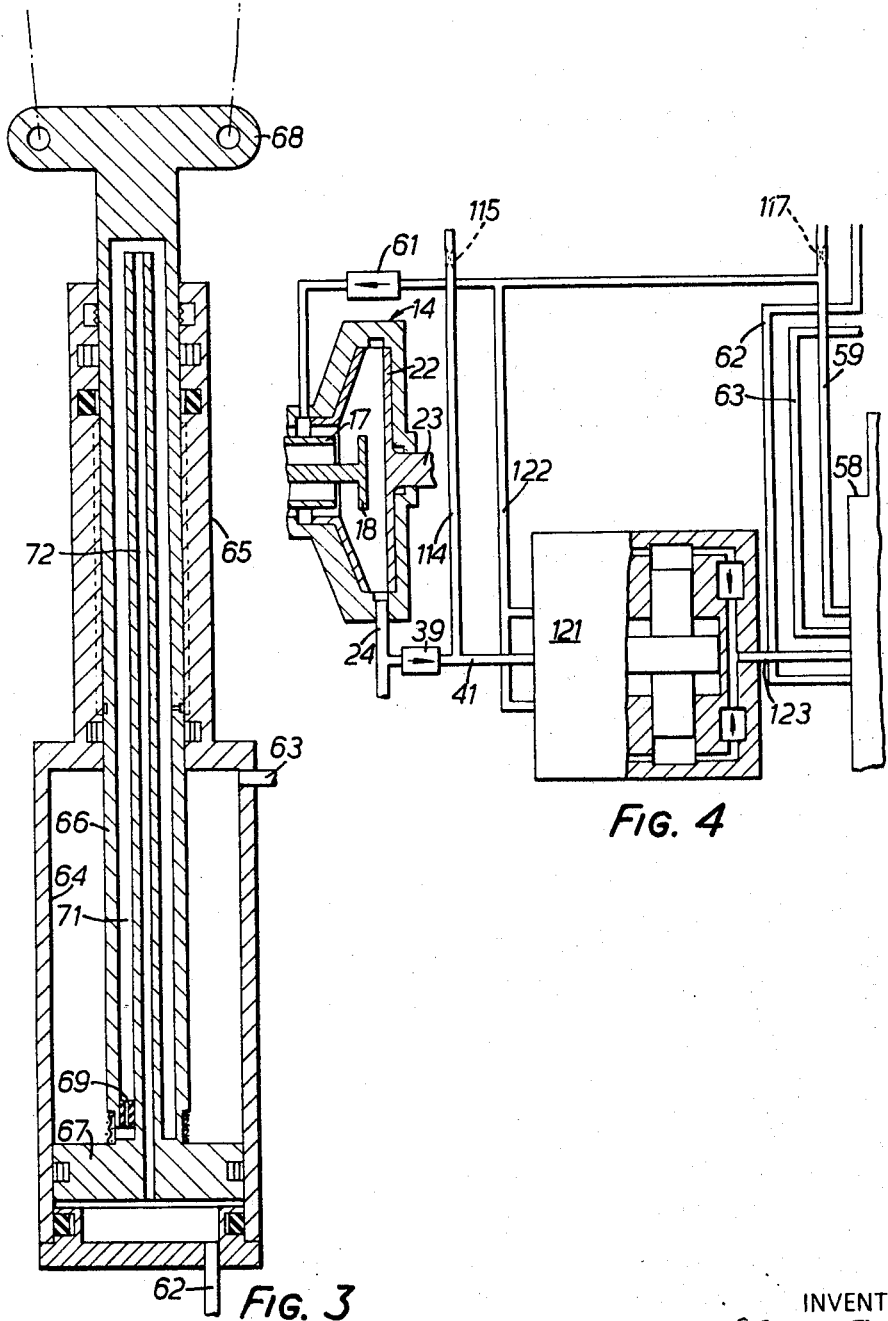

United States Patent Office 3,391,541
Patented July 9, 1968

3,391,541
LIQUID FUEL SUPPLY SYSTEM FOR GAS TURBINE ENGINES
Stanley R. Tyler, Cheltenham, England, assignor to Dowty Fuel Systems Limited, Cheltenham, England, a British company
Filed Oct. 13, 1966, Ser. No. 586,450
Claims priority, application Great Britain, Oct. 20, 1965, 44,444/65
8 Claims. (Cl. 60—235)

ABSTRACT OF THE DISCLOSURE

This invention relates to liquid supply systems of the kind in which the rate of delivery of liquid from a centrifugal pump is regulated by a controllable inlet valve which is arranged between a source of liquid and the inlet of the pump, and in which the liquid within the pump forms an annulus whose radial depth varies in accordance with the hydraulic load of a service supplied by the pump delivery.

---

It further comprises an auxiliary power circuit including a branch pipe leading from the pump delivery, a return pipe connected to the inlet of the centrifugal pump downstream of the inlet valve, and a control valve operable to vary the flow of liquid from the branch pipe to an auxiliary power service, and therefore the return flow of liquid from the auxiliary power service through the return pipe to the pump inlet.

A specific application of the invention is to the supply of liquid fuel in an internal combustion gas turbine engine for aircraft, in which engine burners constitute the service to which liquid fuel is delivered by the centrifugal pump. The auxiliary power service may comprise a number of hydraulic jacks operable to vary the discharge nozzle area of the engine.

Figure 1:
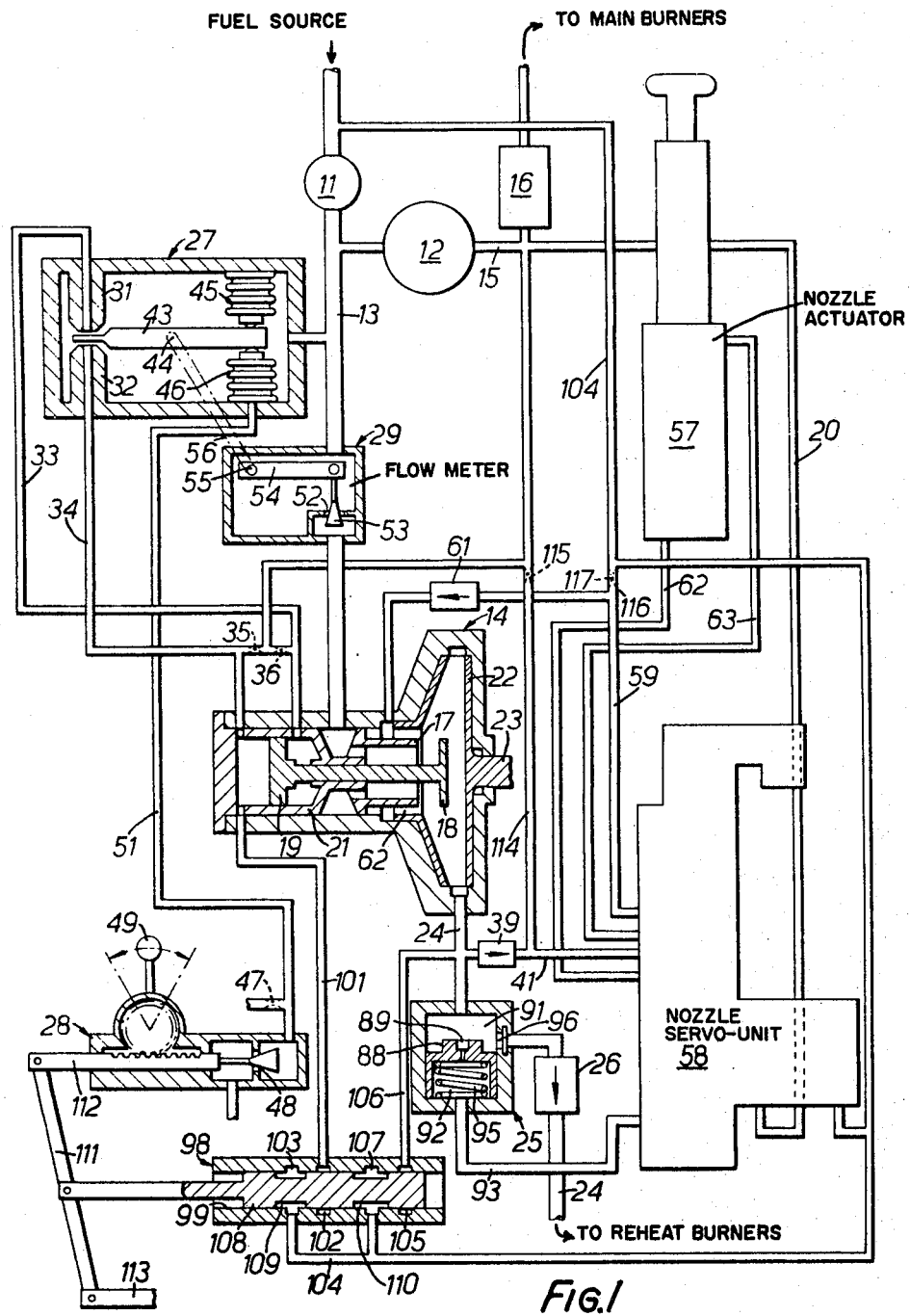
Figure 2:
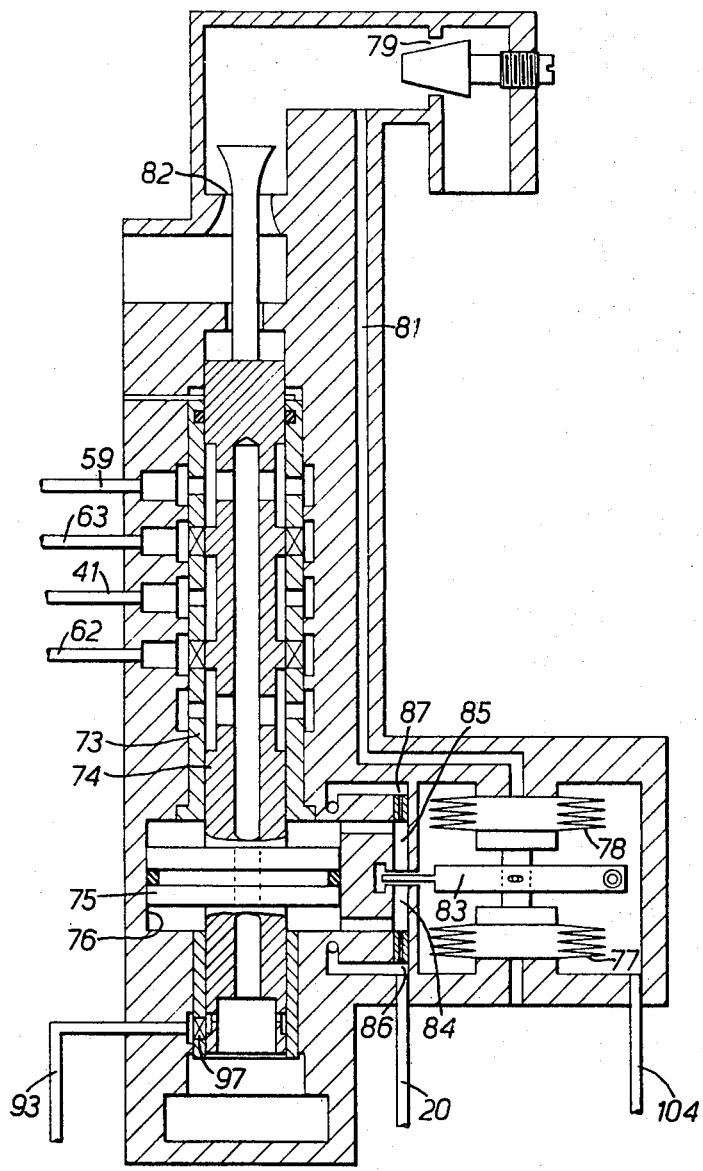

One embodiment of the invention is illustrated in the accompanying drawings, of which:

FIGURE 1 is a circuit diagram of a liquid fuel supply system for an aircraft internal combustion gas turbine engine, FIGURE 2 is a sectional view on an enlarged scale of a control unit shown in FIGURE 1, FIGURE 3 is a sectional view on an enlarged scale of a hydraulic jack shown in FIGURE 1, and FIGURE 4 shows a modification of the circuit diagram of FIGURE 1.

The fuel supply system comprises a boost pump 11 supplied from a source of fuel and delivering to a positive displacement pump 12, and to an inlet conduit 13 which leads to a centrifugal pump 14. The pump 12 supplies fuel to the main engine burners by way of a delivery pipe 15 and a flow control system which is shown generally at 16.

The centrifugal pump 14 has an inlet valve comprising a fixed seat 17 which is supplied with fuel from the conduit 13, and a movable valve member 18 which is operable by a servomotor consisting of a piston 19 movable in a cylinder 21. The pump 14 has an impeller 22 with driving shaft 23, supplying a delivery conduit 24 to a service constituting the reheat burners of the engine by way of a servo operated throttle valve 25 and a non-return valve 26. The servomotor 19, 21 is controlled by a pilot valve 27 in response to a demand signal from a reheat selection device 28 and to a flow feedback signal from a flow-measuring device 29.

The pilot valve 27 has two nozzles 31, 32 connected by pipes 33, 34 to the cylinder 21 on opposite sides respectively of the piston 19.

Both nozzles 31, 32 are supplied with fuel as servo liquid through fixed restrictors 35, 36 respectively from fluid pressure which is supplied from the pump delivery pipe 15. The throttling of the nozzles 31, 32 is varied differentially by one end of a lever 43 which is pivoted at 44. The other end of the lever 43 is loaded differentially by two capsules 45, 46 of which the capsule 46 applies a load in accordance with a fluid pressure signal from the reheat selection device 28.

The reheat selection device 28 has a fixed restrictor 47 supplied with a variable fluid pressure, such as compressor delivery pressure, and a variable restrictor 48 which is regulated by a hand lever 49. A tapping between the restrictors 47, 48 supplies a fluid pressure signal of demand by way of a pipe 51 to the capsule 46.

The flow-measuring device 29 is interposed in the inlet conduit 13, and it comprises an orifice 52, and a plug 53 which is carried by an arm 54 pivoted at 55. The arm 54 is connected to the lever 43 by a resilient torsion rod 56. Fluid flow into the centrifugal pump 14 applies a force on the plug 53 whereby the rod 55 applies a torsional feedback load on the lever 43.

The centrifugal pump 14 provides by way of a non-return valve 39 and a branch pressure supply pipe 41, a source of fluid power for operating an auxiliary power service which, in this embodiment, comprises a number of engine nozzle control jacks, of which one is shown at 57. These jacks are controlled by a control valve unit 58 to which the pipe 41 is connected, and from which a low pressure return pipe 59 is connected back to the inlet of the centrifugal pump 14 through a pressure relief valve 61. Service pipes 62, 63 connect the jack 57 with the control valve unit 58.

The return connection is to an annular space 62 on the outside of the fixed seat 17 so that fuel enters the eye of the impeller 22 without restriction and joins the fuel which is supplied to the eye from the inlet conduit 13 through the inlet valve 17, 18. The nozzle jacks 57 and the control valve unit 58 are thus connected in an auxiliary circuit starting at the pipe 41, and continuing to the pipe 59, and which is completed as a closed loop through the centrifugal pump 14. Since the closed loop lies downstream of the pump inlet valve 17, 18, the fuel flowing therein can be varied by the control unit 58 substantially independently of the control of reheat fuel by the servo motor 19, 21 to the reheat burners.

Each jack 57 is seen from FIGURE 3 to have a cylinder 64 at opposite ends of which the service pipes 62, 63 are connected. A bearing sleeve 65 of substantial length extends from one end of the cylinder 64 and receives a piston rod 66. The inner end of the piston rod 66 terminates in a piston 67 which slides in the cylinder while the outer end 68 is adapted for connection to a movable nozzle section.

The manner in which the jacks are installed is such that they contract to reduce the area of the engine discharge nozzle, and that under the gas pressure in the nozzle they are always under tension, thus requiring a higher pressure in the service pipe 63 than in the service pipe 62. The jacks, moreover, operate in a hot zone of the engine, and each is cooled by providing a restricted flow path from the service pipe 63 to the service pipe 62 through a restrictor 69, an outer annular passage 71 in the piston rod 66 and an inner central passage 72. An additional flow path may be provided along the sliding surfaces of the bearing sleeve 65 and the piston rod 66. Hot fuel is returned through the service pipe 62, the control unit and the low pressure pipe 59 to the centrifugal pump 14 and it mixes with cool fuel which enters the pump 14 when the reheat burners are in operation. The arrangement of an alternative power supply for the jacks 57 will be subsequently described.

There is a difference between the flow in the service pipes 62, 63 on account of the difference in area of opposite sides of the piston 67, but this difference can be kept small by keeping the diameter of the piston rod 66 small. The difference can be eliminated if the piston is provided with a tail rod of the same diameter as the piston rod.

The control unit, FIGURE 2, includes a main valve having a sleeve 73 which is provided with ports for the respective pipes 41, 59, 62 and 63, and a spool 74 which is movable upwardly in the figure from a neutral position to connect the pressure supply pipe 41 to the service pipe 63, and which is movable downwardly to connect the pressure supply pipe 41 to the service pipe 62, the service pipe not so connected being connected to the low pressure return pipe 59. The valve spool 74 is actuated by a servo motor piston 75 which is moved in a cylinder bore 76 by a pilot valve in response to the pressure difference in two capsules 77, 78. The capsule 77 is subject to turbine exhaust pressure, while the capsule 78 is subject to a fraction of compressor delivery pressure.

The latter is applied upstream of a fixed restrictor 79, while a connecting passage 81 to the capsule 78 is open to the pressure which prevails between the fixed restrictor 79, and a second restrictor 82 which is varied in dependence upon the position of the valve spool 74. The pilot valve comprises a pivoted flapper 83 which is controlled by the capsules 77, 78, and two nozzles 84, 85, the pressure in which acts on opposite sides of the servomotor piston 75. The nozzles 84, 85 are supplied with fluid pressure through fixed restrictors 86, 87 respectively by a branch 20 from the delivery pipe 15. The control exerted by the capsules 77, 78 on the main valve 73, 74 causes the jacks 57 to vary the discharge nozzle area of the engine with effect to maintain the pressure ratio across the turbine substantially constant. The capsule chamber into which the nozzles discharge, is vented to a low pressure return pipe 104, the arrangement of which will subsequently be described.

The centrifugal pump 14 provides the hydraulic power required for operating the jacks 57 when the reheat burners are in operation and when high flow rates for rapid control movement of the jacks 57 is required. Under conditions of low reheat flow, the annulus of fuel in the centrifugal pump 14 would not normally have sufficient depth to develop sufficient pressure in the delivery conduit 24 for satisfactory operation of the jacks 57. This is remedied by the throttle valve 25. This valve 25 is of the servo type, having a piston 88 with a fixed restrictor 89 therein between a chamber 91 to which the delivery conduit 24 is connected, and a chamber 92 to which a control pipe 93 is connected. A spring 95 in the chamber 93 urges the piston in the direction to close a discharge orifice 96. The control pipe 93 connects the chamber 92 to a variable restrictor 97 which is controlled by movement of the valve spool 74, FIGURE 2. Upward movement of the valve spool 74 from the neutral position increasingly throttles the restrictor 97 and thus raises the back pressure in the chamber 92. The back pressure in the chamber 92 resists opening movement of the orifice 96 by the throttle valve piston 88 and it therefore increases the pressure in the pipe 41 as the restrictor 97 closes. Closing movement of the orifice 96 causes an increase in the depth of the annulus of fuel in the centrifugal pump 14, thus increasing the pressure available for operating the jacks 57.

A shut-down valve 98 is provided for over-riding control of the centrifugal pump 14 upon selection of REHEAT OFF by the control lever 49. A bore 99 in the valve has one port 102 connected by a pipe 101 to the chamber at the outer end of the servomotor piston 19, and a second port 103 connected to a low pressure pipe 104 which returns to the inlet side of the boost pump 11. Another port 105 is connected by a pipe 106 to the delivery pipe 24 of the centrifugal pump 14, while a further port 107 is also connected to the low pressure pipe 104. A valve spool 108 which is slidable in the bore 99 has two axially spaced recesses 109, 110. The spool 108 is pivoted to an intermediate point on a floating level 111. One end of the lever 111 is pivoted to a rack member 112 which is movable by the control lever 49 for regulating the variable restrictor 48, while the other end of the lever 111 is pivoted to a feedback link 113 which is movable in accordance with changes in area of the engine discharge nozzle. During reheat flow from the centrifugal pump 14, the valve spool 108 closes the ports 102, 105, but upon selection of REHEAT OFF, the valve spool 108 is moved to the right hand side in the figure, partly by the rack member 112 and partly by the feedback link 113. The valve spool recess 109 then connects the port 102 and the pipe 101 to low pressure in the pipe 104, whereupon the servomotor piston 19 moves under fluid pressure on its inner end to close the pump inlet valve 17, 18 except for a residual cooling flow through the pump 14. The valve recess 110 also connects the delivery of the pump 14 by way of the pipe 106 to low pressure in the pipe 104, whereby the residual flow is returned to the inlet side of the boost pump 11.

The alternative power supply for the nozzle control jacks 57 is provided for low rates of movement by the positive displacement pump 12. This is supplied through connecting means which comprises a pipe 114 having a fixed restrictor 115 therein connecting the delivery pipe 15 to the pressure supply pipe 41, and another pipe 116 having a fixed restrictor 117 there in connecting the low pressure return pipes 59 and 104. The fixed restrictors 115, 117 provide sufficient flow through the control unit 58 for operation of the nozzle control jacks 57 at reduced rates of movement, and for cooling flow through the jacks. The flow resistance provided by the restrictors 115, 117 satisfying this condition, is nevertheless high enough to prevent any substantial interaction during REHEAT ON operation between the main burner circuit supplied by the positive displacement pump 12, and the reheat burner circuit supplied by the centrifugal pump 14.

The non-return valve 39 prevents loss of pressure derived from the pump 12 through the pipes 15 and 114 and supplied to the pipe 41 when a lower pressure prevails in the delivery pipe 24 from the centrifugal pump 14.

The pressure relief valve 61 serves, for low rates of jack movement, to prevent fuel discharged into the low pressure pipe 59 from discharging through the centrifugal pump 14 to the low pressure pipe 104. The pressure drop across the relief valve 61 is, nevertheless, insufficient to hinder circulation of fuel in the auxiliary circuit when power is taken from the centrifugal pump for high rates of jack movement.

The higher flow rates required for rapid operation of the nozzle control jacks during REHEAT ON is provided as described by the centrifugal pump without recourse to a supplementary power supply, the centrifugal pump then having adequate delivery for supplying both the reheat burners and the nozzle control jacks.

The modification of FIGURE 1 shown in FIGURE 2 provides a pressure intensifier 121 supplied with fuel under pressure from the pipe 41 and exhausting through a pipe 122 to the low pressure return pipe 59. The intensified, which may be of any known design such as a double-acting differential piston device, has a delivery pipe 123 which supplies high pressure fuel to the main valve 73, 74 of the control unit 58. The intensifier provides a higher working pressure for the several nozzle control jacks 57 whereby the size of these jacks may be reduced to achieve an overall weight economy in the system.

I claim as my invention:

1. A liquid supply system comprising a centrifugal pump having at its inlet a valve which is connected to a source of liquid and having at its outlet a delivery conduit which is connected to a service, flow selection means operable on the valve to vary the rate at which liquid flows from the source and is delivered through the conduit to said service, and an auxiliary power circuit including a branch pipe leading from the delivery conduit, a return pipe connected to the inlet of the centrifugal pump downstream of the inlet valve, an auxiliary power service, and a control valve operable to vary the flow of liquid from the branch pipe to the auxiliary power service, and therefore the return flow of liquid from the auxiliary power service through the return pipe to the pump inlet.

2. A system according to claim 1, wherein the auxiliary power service is operable by augmented fluid pressure from a hydraulic intensifier which is supplied with pressure liquid from the branch pipe.

3. A system for supplying liquid fuel in an internal combustion gas turbine engine, comprising a centrifugal pump having at its inlet a valve which is connected to a source of liquid fuel and having at its outlet a delivery conduit which is connected to burner means, flow selection means operable on the valve to vary the rate at which fuel flows from the source and is delivered through the conduit to said burner means, and an auxiliary power circuit including a branch pipe leading from the delivery conduit, a return pipe connected to the inlet of the centrifugal pump downstream of the inlet valve, an auxiliary power service, and a control valve operable to vary the flow of fuel to the auxiliary power service, and therefore the return flow of fuel from the auxiliary power service through the return pipe to the pump inlet.

4. A system according to claim 3, wherein the auxiliary power service comprises a number of hydraulic jacks operable to vary the discharge nozzle area of the engine.

5. A system according to claim 3, including a second pump arranged between said source and another burner means, and connecting means arranged between said second pump and the auxiliary circuit so that the second pump provides an alternative source of fluid power for operation of the auxiliary power service.

6. A system according to claim 5, wherein the connecting means comprises a connection between the delivery side of the second pump and said branch pipe, and a connection between said return pipe and the low pressure side of the second pump, each of said connections having a flow restrictor therein.

7. A system according to claim 3, wherein a throttle valve is interposed in the delivery conduit from the centrifugal pump downstream of the branch pipe.

8. A system according to claim 7, wherein the throttle valve includes a movable pressure-responsive member, and wherein a variable restrictor is operatively associated with the control valve for varying the restriction thereof in accordance with control valve movement, said variable restrictor being supplied with liquid under pressure, and being adapted to operate the pressure-responsive member in accordance with the rate of liquid flow through the variable restrictor, whereby the pressure-responsive member moves in the valve-closing direction as the control valve is operated in one direction to cause increased flow in the auxiliary power circuit.

References Cited
UNITED STATES PATENTS 3,118,491 1/1964 Simons et al. _____ 158—36.3
3,128,822 4/1964 Tyler _____ 158—36.3

JULIUS E. WEST, *Primary Examiner.*